(12) United States Patent
Bouchard et al.

(10) Patent No.: US 11,181,080 B2
(45) Date of Patent: Nov. 23, 2021

(54) VEHICLE HAVING AIR FILTER ACCESS PANEL

(71) Applicant: BOMBARDIER RECREATIONAL PRODUCTS INC., Valcourt (CA)

(72) Inventors: Sacha Bouchard, Sherbrooke (CA); Serge Lang, Valcourt (CA); Marc Schuler, Sherbrooke (CA); Stephane Veillette, St-Genevieve-de-Batiscan (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 38 days.

(21) Appl. No.: 16/480,734

(22) PCT Filed: Nov. 2, 2017

(86) PCT No.: PCT/IB2017/056842
§ 371 (c)(1),
(2) Date: Jul. 25, 2019

(87) PCT Pub. No.: WO2018/138562
PCT Pub. Date: Aug. 2, 2018

(65) Prior Publication Data
US 2019/0383248 A1    Dec. 19, 2019

Related U.S. Application Data

(60) Provisional application No. 62/451,953, filed on Jan. 30, 2017.

(51) Int. Cl.
*F02M 35/02*    (2006.01)
*B60K 13/02*    (2006.01)
(Continued)

(52) U.S. Cl.
CPC ........ *F02M 35/0201* (2013.01); *B60K 13/02* (2013.01); *F02M 35/048* (2013.01); *F02M 35/162* (2013.01)

(58) Field of Classification Search
CPC combination set(s) only.
See application file for complete search history.

(56) References Cited

U.S. PATENT DOCUMENTS

| | | | |
|---|---|---|---|
| 3,307,336 A * | 3/1967 | Dewsberry | F02M 35/164 55/337 |
| 2005/0280254 A1 * | 12/2005 | Ervin | B62D 23/00 280/781 |

(Continued)

OTHER PUBLICATIONS

International Search Report of PCT/IB2017/056842; Blaine R. Copenheaver; dated Feb. 12, 2018.

*Primary Examiner* — Erez Gurari
(74) *Attorney, Agent, or Firm* — BCF LLP

(57) ABSTRACT

A vehicle has a frame, wheels, left and right seats each having a seat base, an internal combustion engine disposed rearward of the seat bases, an air induction system fluidly connected to the engine, at least one side body panel and an access panel. The air induction system has an air inlet, an air filter, and a throttle body. The at least one side body panel is connected to a side of the frame and defines an aperture. The access panel is movable between a first position and a second position. In the first position, the access panel is connected to the at least one side body panel and covers the aperture. In the second position, the access panel exposes the aperture. The air filter is accessible through the aperture when the access panel is in the second position. A method for removing an air filter is also disclosed.

34 Claims, 14 Drawing Sheets

(51) Int. Cl.
*F02M 35/04* (2006.01)
*F02M 35/16* (2006.01)

(56) References Cited

U.S. PATENT DOCUMENTS

| | | | | |
|---|---|---|---|---|
| 2005/0288151 | A1* | 12/2005 | Yamamoto | F02N 11/103 477/110 |
| 2006/0065231 | A1* | 3/2006 | Nozaki | B60K 13/02 123/198 E |
| 2008/0023249 | A1* | 1/2008 | Sunsdahl | B60N 2/01 180/312 |
| 2008/0127915 | A1* | 6/2008 | Bilek | F02B 75/22 123/54.4 |
| 2010/0078240 | A1* | 4/2010 | Miura | B60K 13/02 180/68.3 |
| 2012/0152632 | A1* | 6/2012 | Azuma | F02M 35/04 180/68.3 |
| 2013/0319785 | A1* | 12/2013 | Spindler | B62D 23/005 180/292 |
| 2014/0224563 | A1* | 8/2014 | Shinbori | B60K 5/00 180/291 |
| 2014/0261275 | A1* | 9/2014 | Takahashi | F02M 35/161 123/184.21 |
| 2015/0375614 | A1* | 12/2015 | Osaki | B60N 2/01 180/291 |
| 2017/0029035 | A1* | 2/2017 | Dube | B60R 11/00 |

* cited by examiner

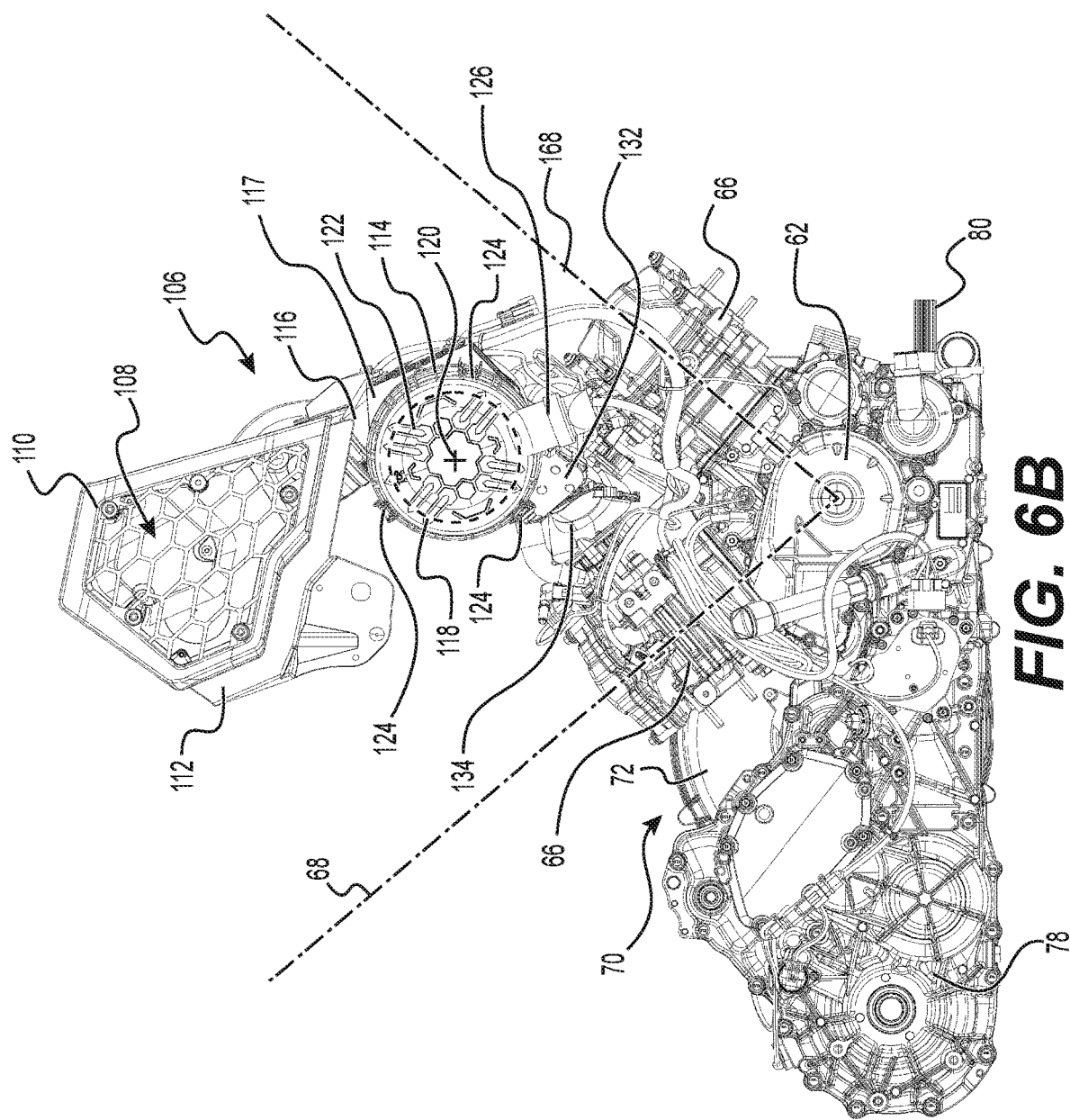

VEHICLE HAVING AIR FILTER ACCESS PANEL

CROSS-REFERENCE

The present application claims priority to U.S. Provisional Patent application No. 62/451,953, filed Jan. 30, 2017, the entirety of which is incorporated herein by reference.

FIELD OF TECHNOLOGY

The present technology relates to vehicles having an air filter access panel.

BACKGROUND

Side-by-side vehicles (SSVs) are four-wheeled vehicle designed for off-road use. They have a driver seat and a passenger seat disposed side-by-side inside a passenger area defined in part by a roll cage. Some SSVs also have a second row of two or more seats. In order to allow for additional storage, some SSVs are also provided with a cargo box at the rear thereof.

SSVs are typically powered by an internal combustion engine. The engine is sometimes provided rearward of the seats under the cargo box. In order to help prevent dirt and other airborne particles out of the engine, the engine's air induction system includes an air filter. As the air filter becomes loaded with dirt and airborne particle over time, it needs to be replaced or cleaned. As would be understood, this means that access to the air filter is required.

In SSVs where the engine is rearward of the seat and under the cargo box, access to the filter is sometimes achieved via a removable portion in the floor of the cargo box. One of the drawbacks is that in order to access the air filter, one first needs to empty the cargo box. Another drawback is that providing this removable portion in the cargo box weakens the cargo box in the area of the removable portion.

One solution consists in providing the air filter in the front of the vehicle where more room is available, and therefore access can be achieved more easily. However, moving the air filter away from the engine requires longer pipes to connect the air filter to the engine, which can have an adverse effect on engine efficiency.

There is therefore a desire for a vehicle having features facilitating access to the air filter.

SUMMARY

It is an object of the present technology to ameliorate at least some of the inconveniences present in the prior art.

According to one aspect of the present technology, there is provided a vehicle having a frame, two front wheels operatively connected to the frame, two rear wheels operatively connected to the frame, a left seat connected to the frame, a right seat connected to the frame, the left and right seats being disposed side-by-side, each of the left and right seats having a seat base, an internal combustion engine connected to the frame, the internal combustion engine being disposed rearward of the seat bases, the internal combustion engine being operatively connected to at least one of: the two front wheels and the two rear wheels, an air induction system fluidly connected to the internal combustion engine for supplying air to the internal combustion engine, at least one side body panel and an access panel. The air induction system has an air inlet, an air filter fluidly connected to the air inlet, and a throttle body fluidly connected between the air filter and the internal combustion engine, the air filter being fluidly connected between the air inlet and the throttle body. Air to be supplied to the internal combustion engine flows through the air inlet, then through the air filter, then through the throttle body and then to the internal combustion engine. The at least one side body panel is connected to a side of the frame. The at least one side body panel defines an aperture. The aperture faces generally laterally. The access panel is movable between a first position and a second position. In the first position, the access panel is connected to the at least one side body panel and covers the aperture. In the second position, the access panel exposes the aperture. The air filter is accessible through the aperture when the access panel is in the second position.

In some implementations of the present technology, the air filter is removable through the aperture when the access panel is in the second position.

In some implementations of the present technology, the air filter is at least partially aligned with the aperture.

In some implementations of the present technology, a projection of the air filter onto a longitudinal vertical plane is contained within a projection of a perimeter of the aperture onto the longitudinal vertical plane.

In some implementations of the present technology, the air induction system also has an air filter housing. The air filter housing is fluidly connected between the air inlet and the throttle body. The air filter housing is at least partially aligned with the aperture. The air filter is selectively disposed in the air filter housing.

In some implementations of the present technology, when the access panel is in the second position, the air filter is removable through the aperture by displacing the air filter along a central axis of the air filter housing. The central axis extending through the aperture.

In some implementations of the present technology, a cap is selectively connected to the air filter housing. The cap is at least one of accessible and removable through the aperture when the access panel is in the second position. The air filter disposed in the air filter housing is accessible through the aperture when the access panel is in the second position and when the cap is disconnected from the filter housing.

In some implementations of the present technology, the air inlet is vertically higher than the air filter.

In some implementations of the present technology, the air inlet is rearward of the left and right seats.

In some implementations of the present technology, the air filter is vertically higher than the internal combustion engine.

In some implementations of the present technology, the air filter is rearward of the seat bases.

In some implementations of the present technology, the air filter is laterally between the internal combustion engine and the at least on side body panel.

In some implementations of the present technology, a firewall is disposed between internal combustion engine and the left and right seats.

In some implementations of the present technology, a cargo box has a floor. The cargo box is connected to the frame and is disposed rearward of the left and right seats. The air filter is vertically lower than the floor of the cargo box.

In some implementations of the present technology, the air inlet is vertically higher than the floor of the cargo box.

In some implementations of the present technology, a fuel tank is connected to the frame and is disposed at least in part rearward of the seat bases. The air filter is vertically higher than the fuel tank.

In some implementations of the present technology, a portion of the fuel tank is disposed under one of the seat bases.

In some implementations of the present technology, the fuel tank has a filler neck and a fuel cap. The filler neck extends through the at least one side body panel and defines a fuel tank inlet. The fuel cap selectively covers the fuel tank inlet. The fuel cap is vertically lower than the air filter when the fuel cap covers the fuel tank inlet.

In some implementations of the present technology, in the second position, the access panel is removed from the vehicle.

In some implementations of the present technology, the at least one side body panel includes a rear fender. The rear fender defines at least a portion of the aperture.

In some implementations of the present technology, the internal combustion engine includes a first cylinder having a first cylinder axis and a second cylinder having a second cylinder axis. The air filter is disposed longitudinally between the first and second cylinder axes.

In some implementations of the present technology, the air inlet and the throttle body are disposed longitudinally between the first and second cylinder axes.

In some implementations of the present technology, the internal combustion engine is a V-type engine.

In some implementations of the present technology, the air filter is forward of the two rear wheels.

In some implementations of the present technology, the aperture is forward of the two rear wheels.

According to another implementation of the present technology, there is provided a method for removing an air filter from a wheeled vehicle driven by an internal combustion engine. The method comprises: moving an access panel from a first position to a second position, in the first position the access panel covering an aperture, in the second position the access panel exposing the aperture, the aperture being defined by at least one side body panel connected to a frame of the vehicle, the aperture facing generally laterally; and removing the air filter through the aperture.

In some implementations of the present technology, moving the access panel from the first position to the second position comprises removing the access panel from the vehicle.

In some implementations of the present technology, the method further comprises removing the air filter from an air filter housing prior to removing the air filter through the aperture.

In some implementations of the present technology, the method further comprises removing a cap from the air filter housing prior to removing the air filter from the air filter housing.

In some implementations of the present technology, removing the air filter through the aperture comprises displacing the air filter through the aperture along a generally laterally extending axis.

In some implementations of the present technology, the generally laterally extending axis is vertically higher than the internal combustion engine.

In some implementations of the present technology, the generally laterally extending axis is rearward of the seat bases.

In some implementations of the present technology, the generally laterally extending axis is vertically lower than a floor of a cargo box of the vehicle.

In some implementations of the present technology, the generally laterally extending axis is vertically higher than a fuel tank of the vehicle.

In some implementations of the present technology, the generally laterally extending axis extends between two cylinder axes defined by two cylinders of the internal combustion engine.

In some implementations of the present technology, the generally laterally extending axis is forward of two rear wheels of the vehicle.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6B is a right side elevation view of the elements of FIG. 6A;

DETAILED DESCRIPTION

Figure 1:
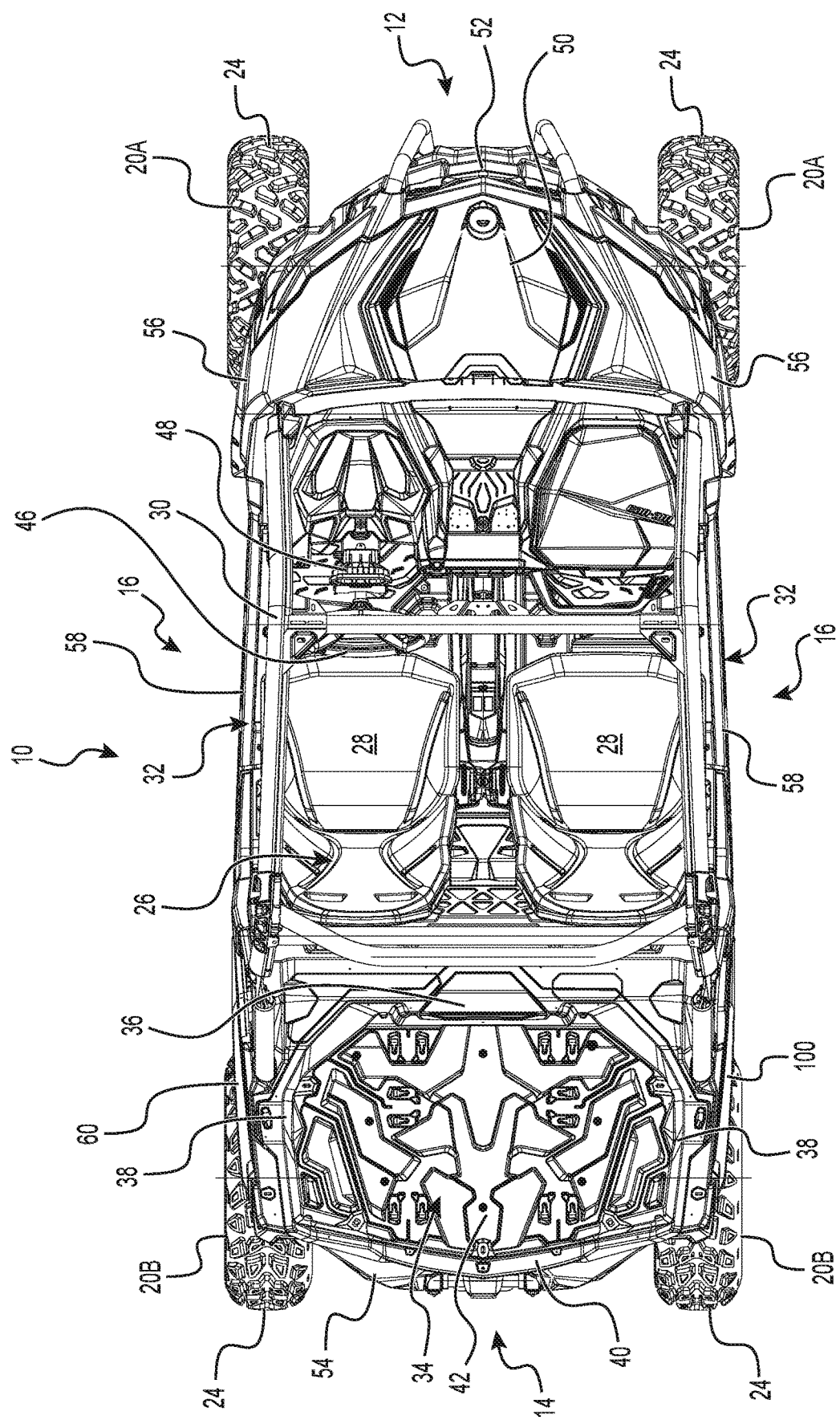
FIG. 1 is a top plan view of a side-by-side vehicle.

A side-by-side vehicle (SSV) 10 is illustrated in FIGS. 1 to 4. The SSV 10 has a front end 12, a rear end 14, and two lateral sides 16 (left and right). The SSV 10 includes a frame 18. A pair of front wheels 20A is suspended from the front portion of the frame 18 via front suspension assemblies 22A. A pair of rear wheels 20B is suspended from the rear portion of the frame 18 via rear suspension assemblies 22B. Each of the four wheels 20A, 20B has a tire 24. A cockpit area 26 is disposed in the middle portion of the frame 18. Left and right seats 28 are connected to the middle portion of the frame 18. As can be seen in FIG. 1, the seats 28 are disposed side-by-side in the cockpit area 26. As best seen in FIG. 5B for the right seat 28, each seat 28 is a bucket seat having a seat base 28A and a backrest 28B. Each backrest 28B incorporates a headrest 28C. It is contemplated that the seats 28 could be other types of recumbent seats. Each seat 28 is also provided with a seat belt 29 (FIG. 5A).

A roll cage 30 is connected to the frame 18 and is disposed above the cockpit area 26. The roll cage 30 is an arrangement of metal tubes that contributes to protecting the riders. The roll cage 30 has several attachment points to the frame 18. The cockpit area 26 is open at the two lateral sides 16 of the SSV 10, forming two lateral passages 32 (left and right), through which the riders can ingress and egress the SSV 10. It is contemplated that doors could be provided in the two lateral passages 32 to selectively partially close the lateral passages 32.

A cargo box 34 is mounted to the frame 18 rearward of the seats 28. It is contemplated that the cargo box 34 could be replaced by a cargo rack. In the present implementation, the carbo box 34 is fixed to the frame 18, but it is also contemplated that the cargo box 34 could be pivotally mounted to the frame 18. It is contemplated that in some implementations, the cargo box 34 could be omitted. The cargo box 34 has a front wall 36, two side walls 38, a rear wall 40 and a floor 42. As best seen in FIG. 4, the rear wall 40 is lower than the side walls 38, thus facilitating access to the cargo space defined by the cargo box 34. The vertical level of the floor 42 is indicated by line 44 in FIG. 3.

A steering device including a steering wheel 46 is disposed in front of the left seat 28. It is contemplated that the steering wheel 46 could be disposed in front of the right seat 28. The steering device is operatively connected to the two front wheels 20A to permit steering of the SSV 10. A display cluster 48 is disposed in front of the steering wheel 46. A throttle operator in the form of a throttle pedal (not shown) is disposed over the floor 42 of the cockpit area 26 below the steering wheel 46 and in front of the left seat 28.

The SSV 10 has a vehicle body mounted to the frame 18. The vehicle body includes a hood 50, a front body panel 52, a rear body panel 54 and a number of side body panels. On the left side of the SSV 10, the side body panels are connected to their respective sides of the frame 18. The side body panels include front right and left fenders 56, lower central right and left panels 58, a rear left fender 60 and a rear right fender 100. As will be described in more detail below, the rear right fender 100 defines an aperture 102 (FIG. 3) and an access panel 104 selectively covers the aperture 102. The aperture 102 faces generally laterally toward the right of the SSV 10. It is contemplated that the hood 50, the front body panel 52, the rear body panel 54, the fenders 56, 60, 100, and the lower central panels 58 could each be replaced by multiple panels. It is also contemplated that the vehicle body of the SSV 10 could have more or less body panels than described above.

The SSV 10 is powered by an internal combustion engine 62 (see FIG. 5A for example). The engine 62 is disposed rearward of the seat bases 28A below the cargo box 34. As can be seen in FIG. 5B, the forward portion of the engine 62 is disposed forward of a vertical plane 63 containing the rearmost point of each backrest 28B. In the present implementation, the rearmost point of the each backrest 28B is near the upper end of the headrest 28C. In implementations where a longitudinal position of the seats 28 is adjustable, the plane 63 is defined with the seats 28 in their rearmost positions. As can be seen in FIG. 5A, a firewall 64 is disposed between the seats 28 and the engine 62. The engine 62 is a four-stroke, V-type engine having two cylinders 66. Each cylinder 66 defines a cylinder axis 68 (FIG. 6B).

Figure 5A:
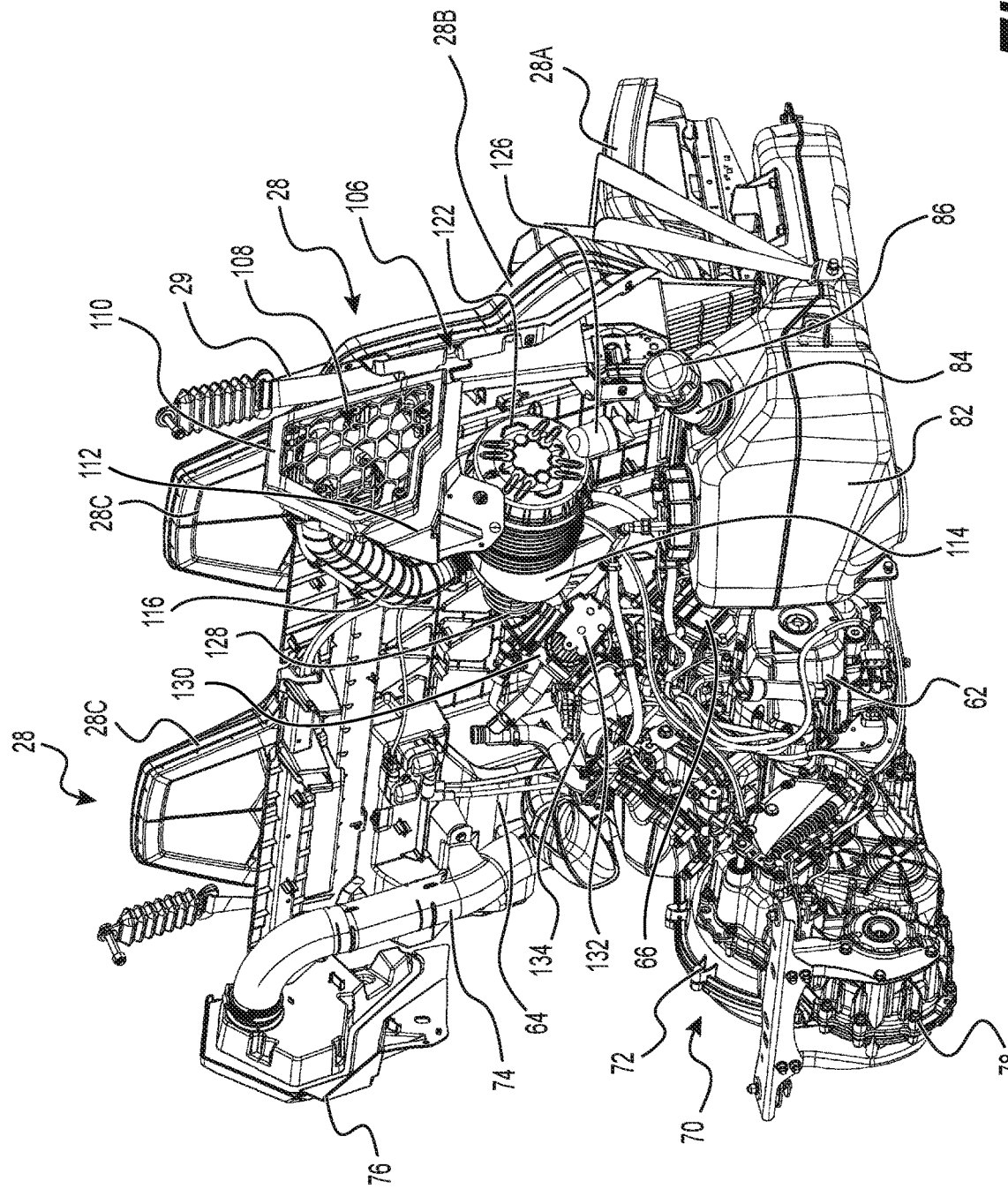
FIG. 5A is a perspective view taken from a rear, right side of an engine, a continuously variable transmission (CVT), a transaxle, an air induction system, a fuel tank, a firewall and seats of the vehicle of FIG. 1.
Figure 5B:
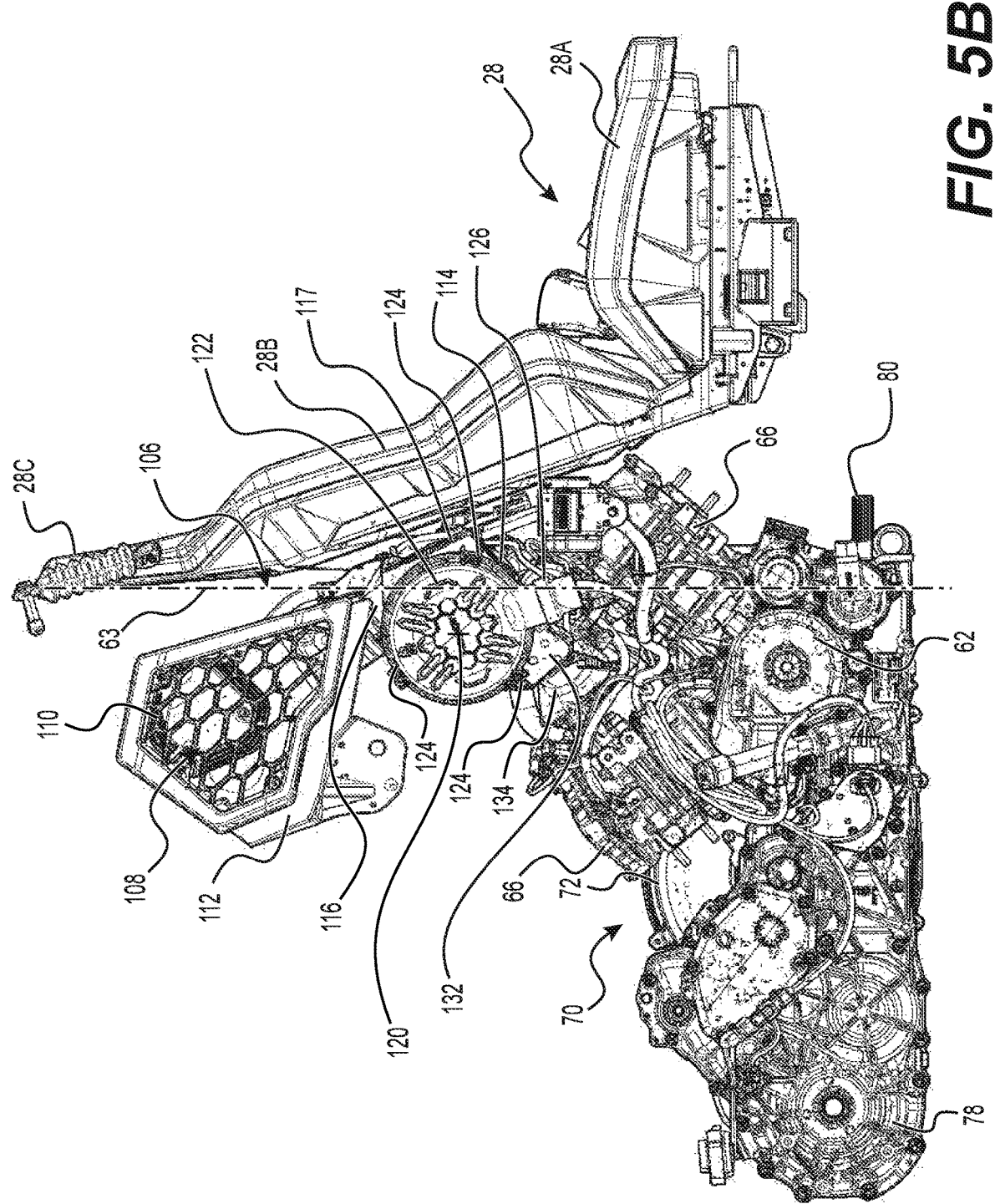
FIG. 5B is a right side elevation view of the engine, the CVT, the transaxle, the air induction system and seats of the vehicle of FIG. 1.
Figure 5C:
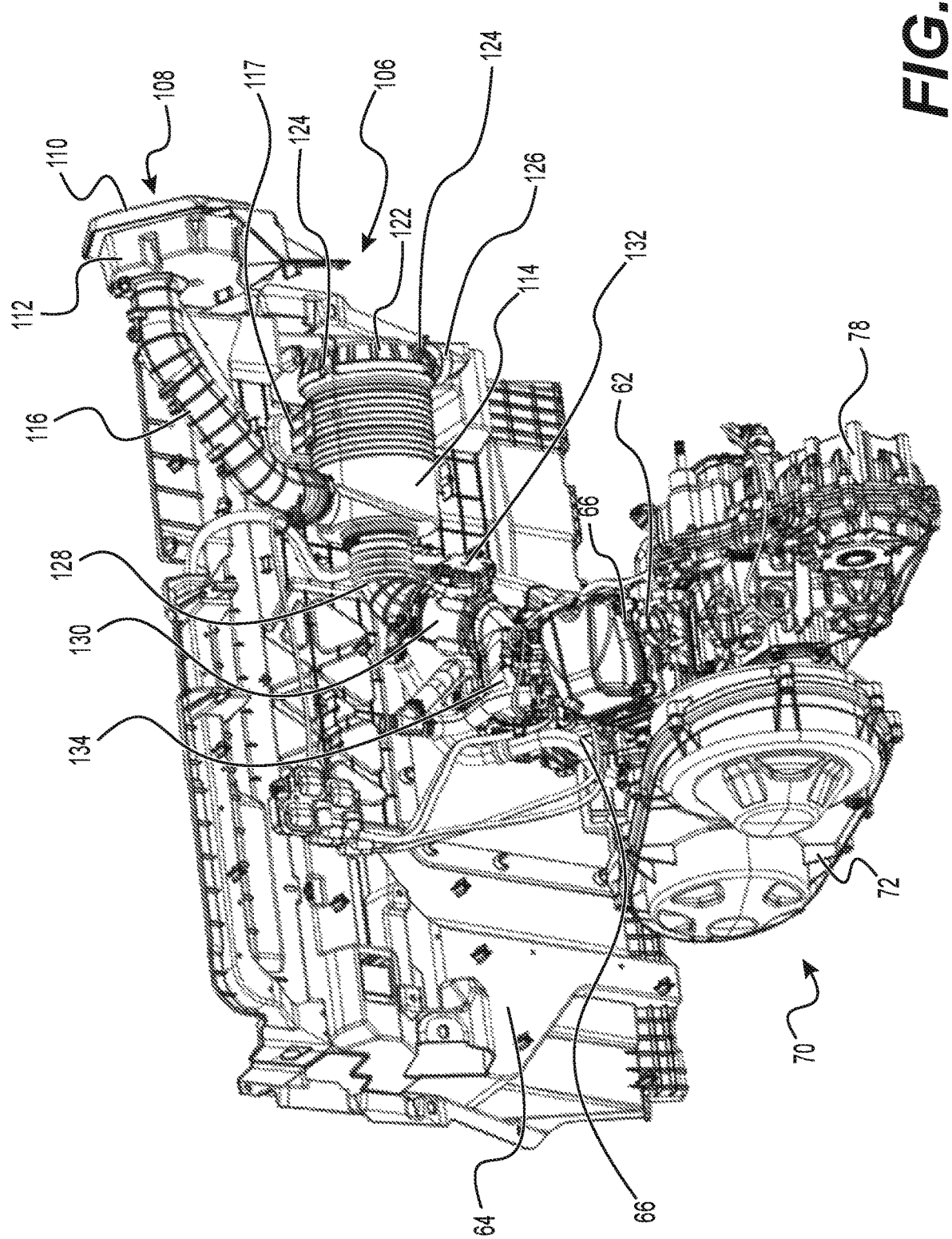
FIG. 5C is a perspective view taken from a rear, left side of the engine, the CVT, the transaxle, the air induction system and the firewall of the vehicle of FIG. 1.

As best seen in FIG. 5C, the engine 62 drives a continuously variable transmission (CVT) 70 disposed on a left side of the engine 62. The CVT 70 has a housing 72. Air is supplied to the housing 72 to cool the CVT 70 via an air intake 74 that has an inlet 76 opening on a left side of the SSV 10. It is contemplated that the CVT 70 and the air intake 74 could be disposed on the right side of the engine 62. The CVT 70 drives a transaxle 78 connected to the back of the engine 62. The transaxle 78 drives the two rear wheels 20B via two half-shafts (not shown). A driveshaft 80 (FIG. 6B) extends forwardly of and is driven by the transaxle 78. The driveshaft 80 drives other driveshafts (not shown) that drive a front differential (not shown) at the front of the SSV 10. The front differential drives the two front wheels 20A via two half-shafts (not shown). It is contemplated that the engine 62 could drive the wheels 20A, 20B of the SSV 10 by means other than the ones described above. It is also contemplated that only two of the four wheels 20A, 20B could be driven by the engine 62.

Figure 9:
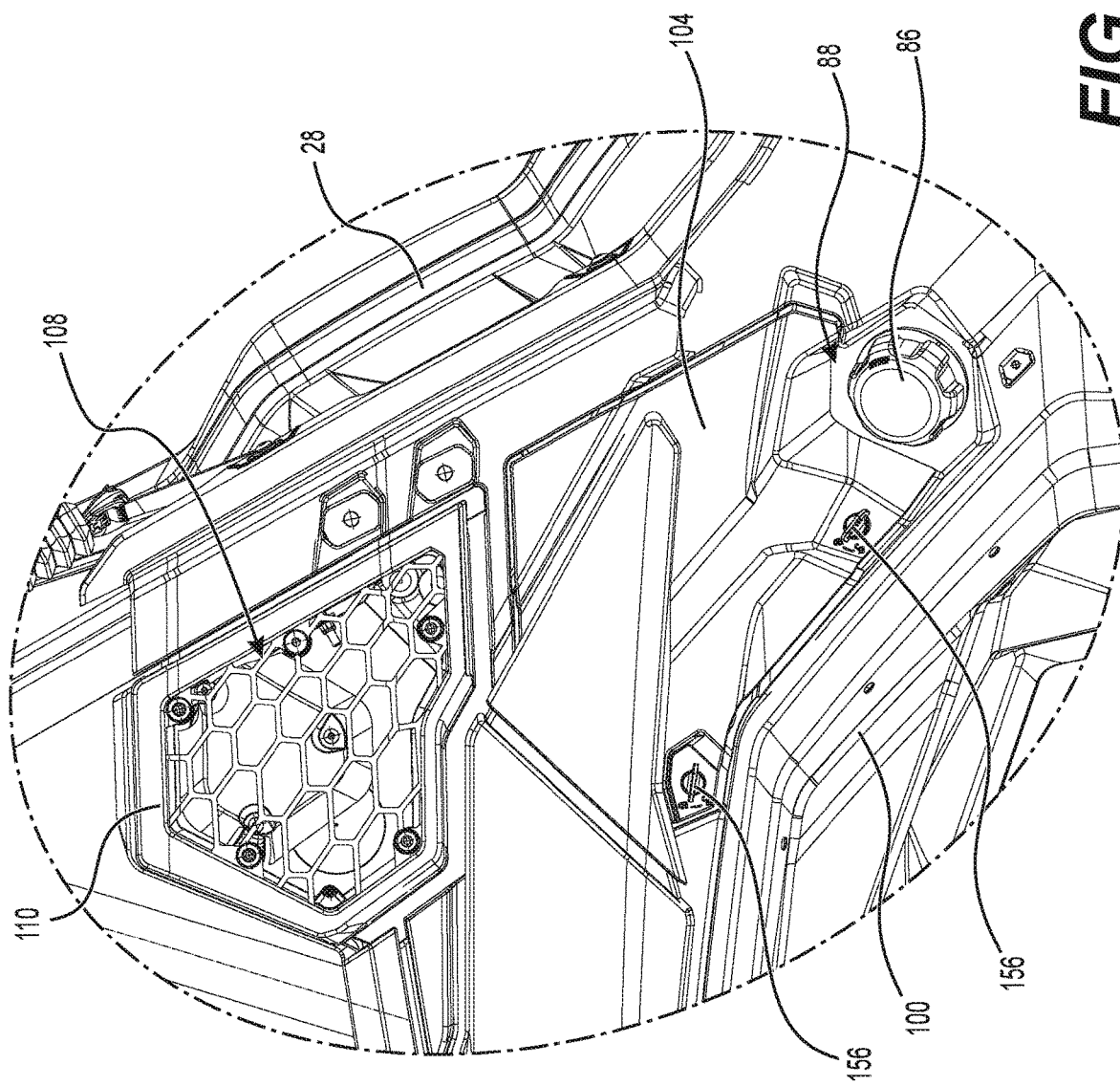
FIG. 9 is a close-up right side elevation view of a portion of the vehicle of FIG. 1 rearward of the passenger seat with the access panel installed.

Fuel to be delivered to the engine 62 is stored in a fuel tank 82, shown in FIG. 5A. The fuel tank 82 is disposed to the right of the engine 62 and in part rearward of the seat bases 28A, and more specifically in part behind the right seat base 28A. As can be seen, a front portion of the fuel tank 82 is disposed under the right seat base 28A. The fuel tank 82 has a filler neck 84 that extends upward and to the right through the rear right fender 100 below the aperture 102 and defines the fuel tank inlet. A removable fuel cap 86 covers the fuel tank inlet at the end of the filler neck 84. As best seen in FIG. 9, the fuel cap 86 is received in a recess 88 defined in the side of the rear right fender 100. It is contemplated that the fuel tank 82 could be disposed on the left side of the engine 62.

Figure 2:
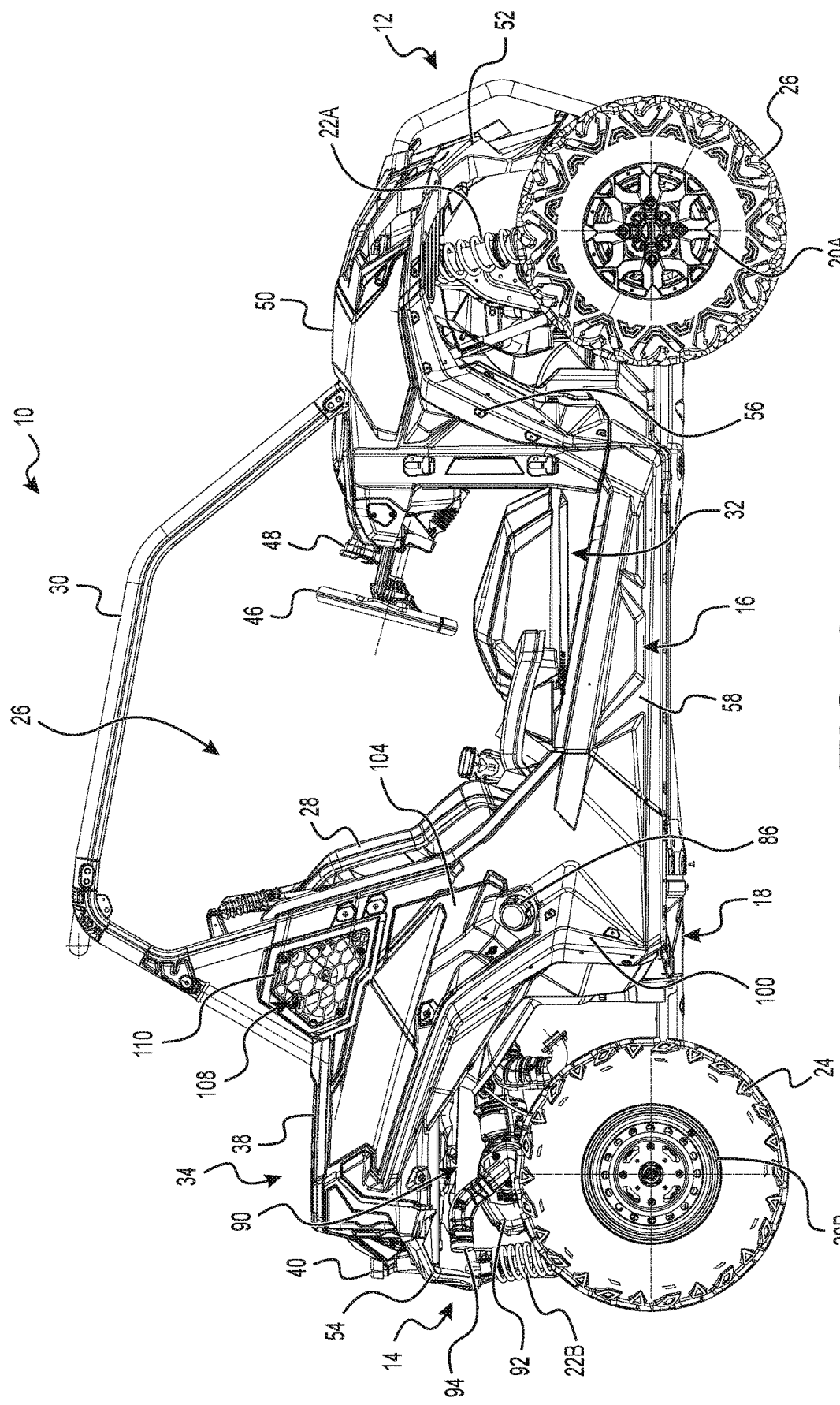
FIG. 2 is a right side elevation view of the vehicle of FIG. 1.
Figure 3:
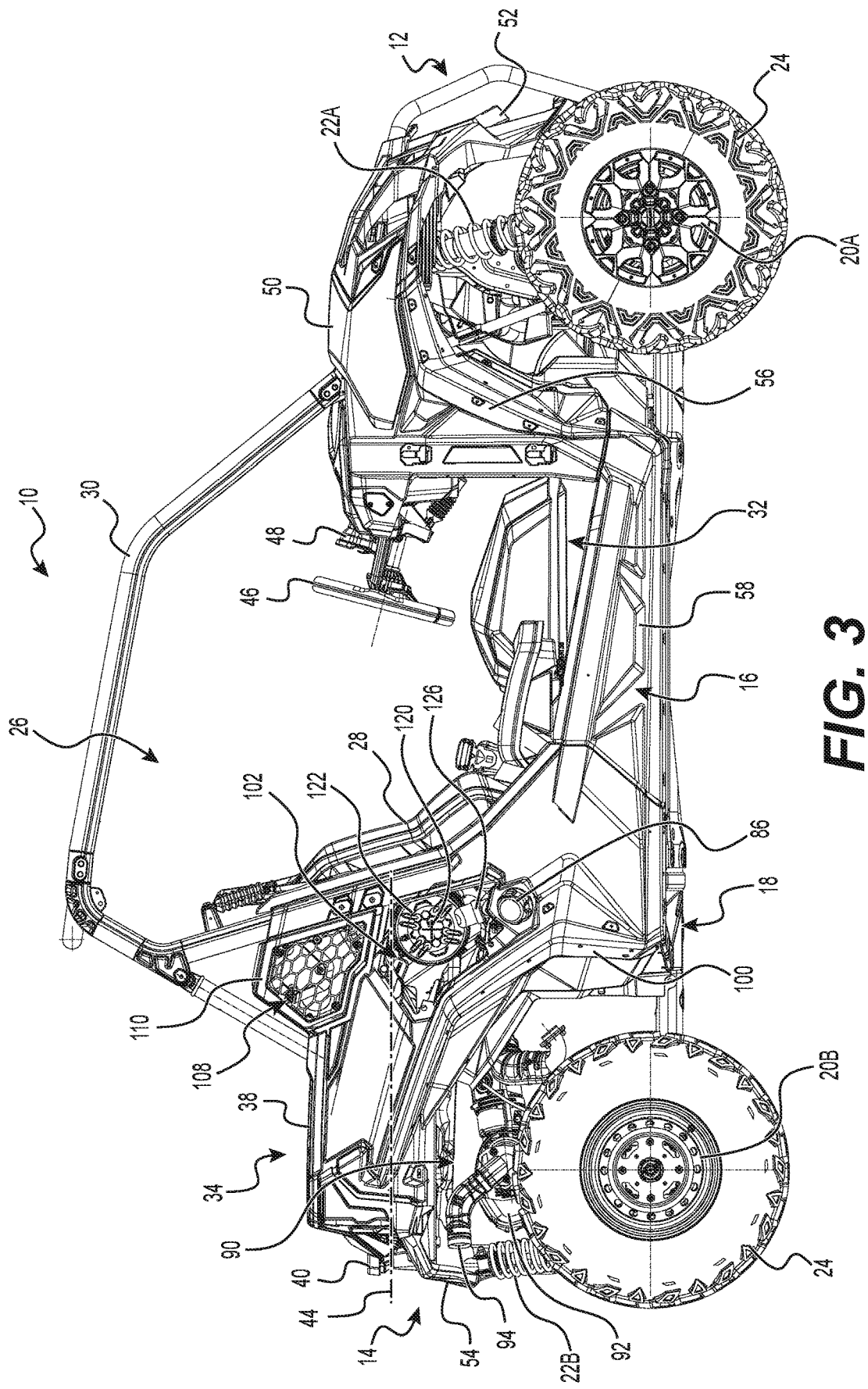
FIG. 3 is a right side elevation view of the vehicle of FIG. 1 with an access panel removed to provide access to an air filter housing.
Figure 4:
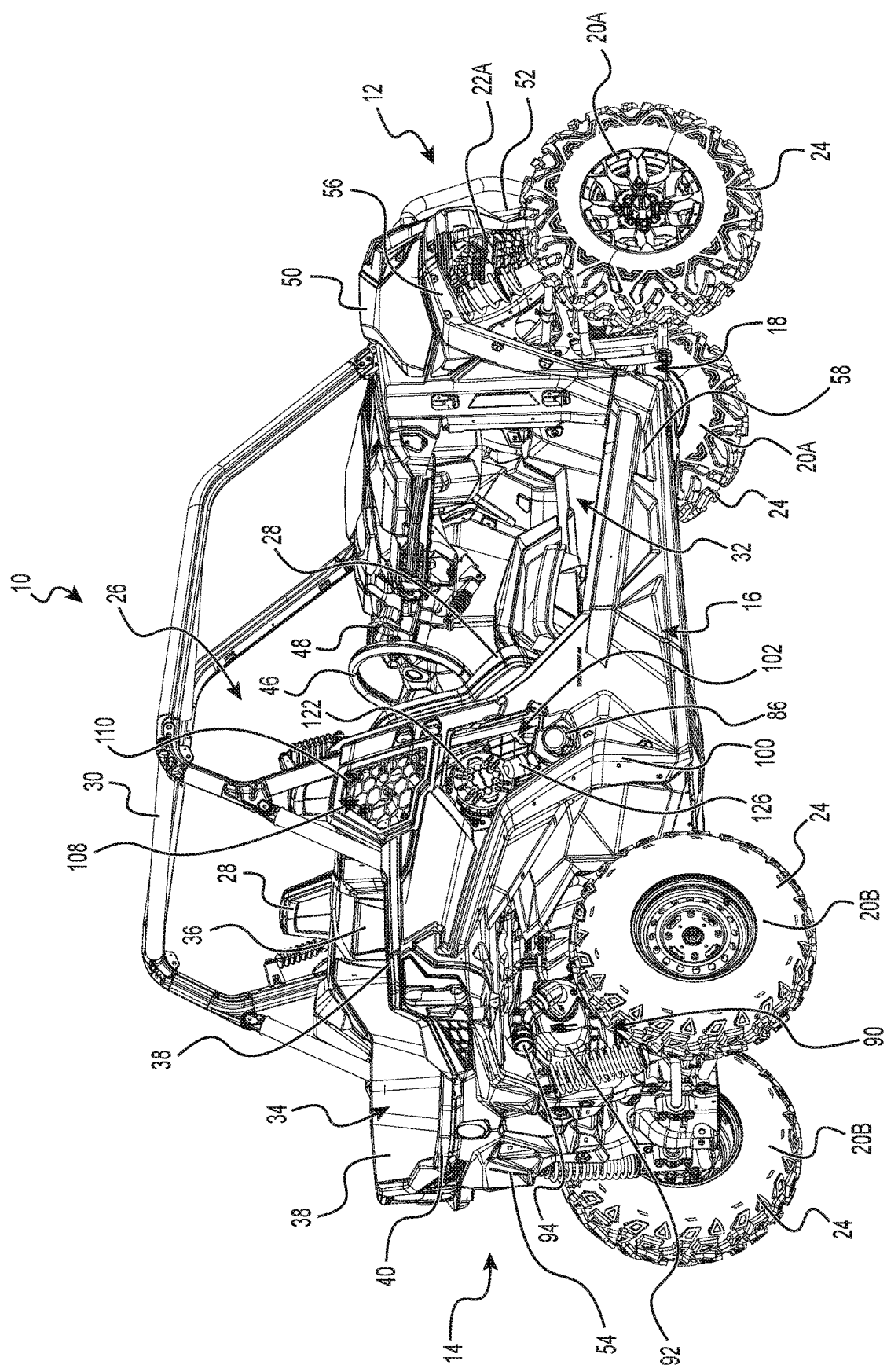
FIG. 4 is a perspective view taken from a rear, right side of the vehicle of FIG. 1 with the access panel removed.

Exhaust gases are expelled from the engine 62 via an exhaust system 90 that is partially shown in FIGS. 2 to 4. The exhaust system 90 includes a muffler 92 that extends laterally below the cargo box 34 and has an outlet 94 that faces rearward on a right side of the SSV 10. It is contemplated that an exhaust system that differs from the one illustrated in FIGS. 2 to 4 could be used.

Turning now to FIGS. 5A to 6B, an air induction system 106 supplying air to the engine 62 will be described. The air induction system 106 has an air inlet 108 facing generally toward the right of the SSV 10. The air inlet 108 is covered by a honeycomb grille 110. It is contemplated that the grille 110 could be of a type other than the honeycomb grille 110 shown in the figures. The grille 110 is connected to a chamber 112. As can be seen in FIG. 1, the air inlet 108 is disposed rearward of the seats 28. The upper portion of the air inlet 108 is vertically higher than the right side wall 38 of the cargo box 34. The air inlet 108 is completely vertically higher than the floor 42 of the cargo box 34. As can be seen in FIG. 6B, from a right side view of the SSV 10, the air inlet 108 is inside the V-shape formed by the two cylinder axes 68. As such, the air inlet 108 is disposed longitudinally between the cylinder axes 68.

Figure 6A:
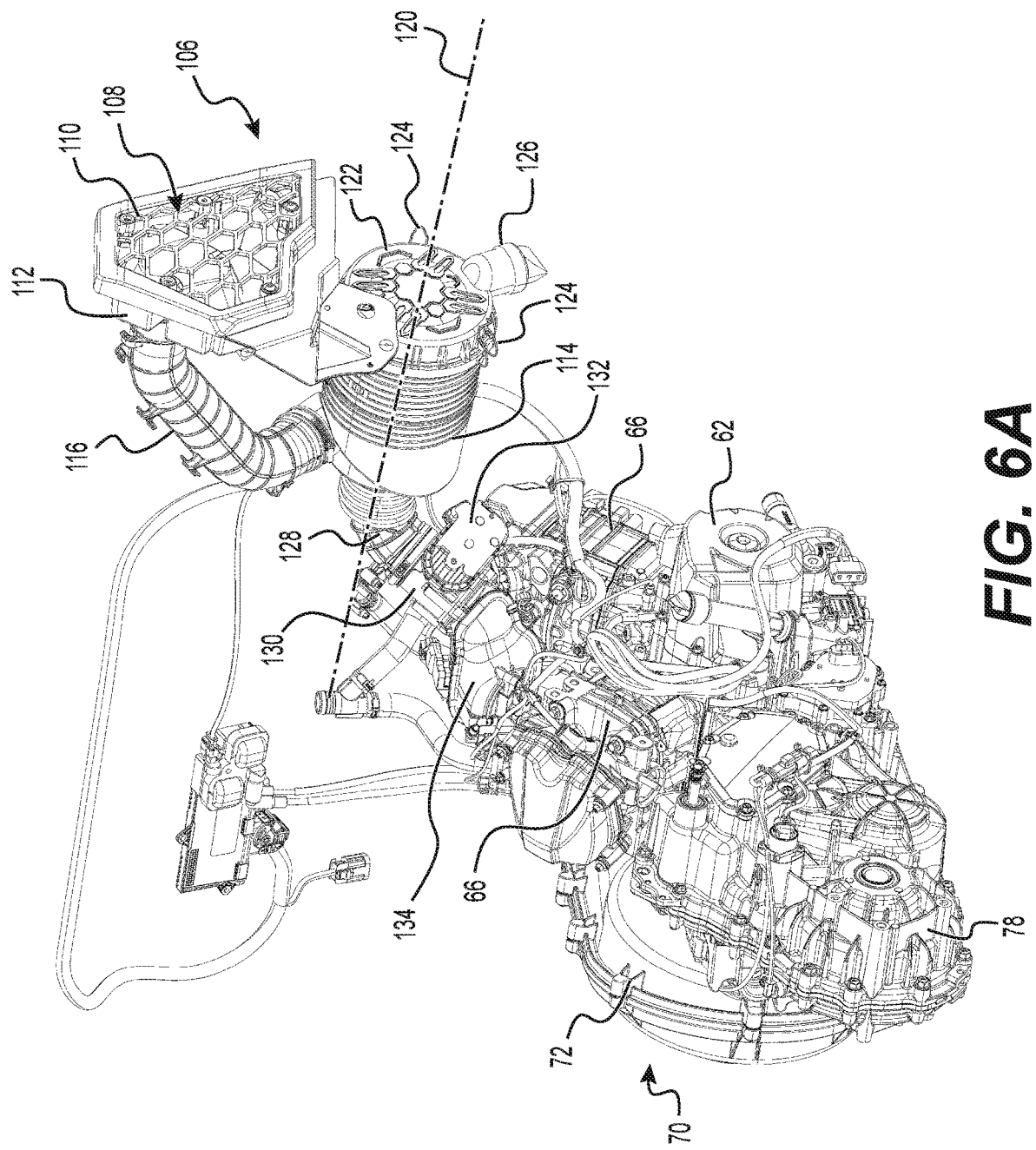
FIG. 6A is a perspective view taken from a rear, right side of the engine, the CVT, the transaxle and air induction system of FIG. 5A.

The chamber 112 is fluidly connected to an air filter housing 114 by an air intake conduit 116. The air intake conduit 116 extends downward from the chamber 112 to the air filter housing 114. The air filter housing 114 is disposed rearward of the seat bases 28A and partially forward of the plane 63 as can be seen in FIG. 5B. As best seen in FIG. 5C, the air filter housing 114 is connected to the firewall 64 by a bracket 117. The bracket 117 is welded to the air filter housing 114 and is fastened to the firewall 64. An air filter 118 is disposed in the air filter housing 114. The air filter 118 is shown removed from the air filter housing 114 in FIG. 11. The position of the air filter 118 in the air filter housing 114 is shown by a dotted line in FIGS. 6B and 10. The air filter 118 has a central axis 120. When the air filter 118 is in the air filter housing 114, the central axis 120 of the air filter 118 extends generally laterally, as can be seen in FIG. 6A, and corresponds to a central axis of the air filter housing 114. In the present implementation, both the air filter 118 and the air filter housing 114 are generally cylindrical in shape, but other shapes are contemplated.

The air filter housing 114 is opened on the right side thereof. The open end of the air filter housing 114 and the air inlet 108 face generally in the same direction (i.e. rightward). A removable cap 122 closes the opened end of the air filter housing 114. The cap 122 is held onto the air filter housing 114 by three clips 124 (FIG. 6B). It is contemplated that more or less than three clips 124 could be provided. It is also contemplated that the cap 122 could be selectively connected to the air filter housing 114 by other means. For example, the cap 122 could be a twist cap threaded onto the end of the air filter housing 114. The cap 122 has a flexible tube 126 extending downward from a lower portion thereof. The tube 126 has a slit (not shown) on the lower end thereof. When a user compresses the tube 126, the slit opens and some of the dust and debris that has collected inside the air filter housing 114 falls out of the tube 126. It is contemplated that the tube 126 could be omitted.

Figure 10:
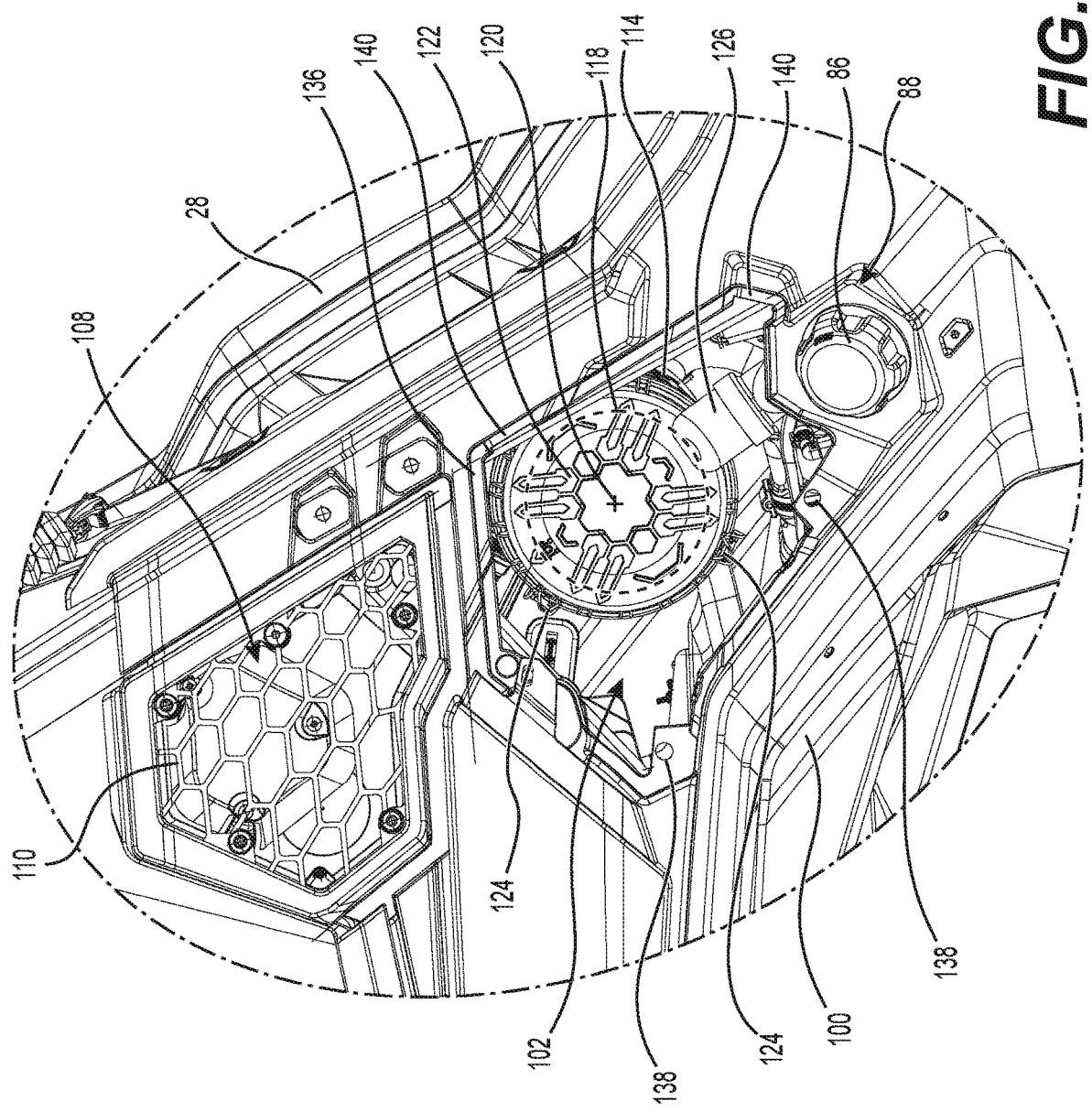
FIG. 10 is the close-up right side elevation view of FIG. 9 with the access panel removed.

As best seen in FIG. 10, the air filter housing 114 and the cap 122 are partially aligned with the aperture 102. Although the cap 122 is not fully aligned with the aperture 102, the space between the cap 122 when it is mounted to the air filter housing 114 and the inside surface of the rear right fender 100 is sufficient to allow removal of the cap 122. Once removed, the cap 122 can then be displaced in alignment with the aperture 102 and be removed through the aperture 102 as will be described further below. It is contemplated that the cap 122 could be hinged or otherwise tied to the air filter housing 114, in which case the cap 122 would be accessible through the aperture 102 so as to be opened, but would not be removable through the aperture 102. When the air filter 118 is disposed inside the air filter housing 114, the air filter 118 is aligned with the aperture 102 and the central axis 120 of the air filter 118 extends through the aperture 102. As can also be seen in FIG. 10, a projection of the air filter 118 onto a longitudinal vertical plane (i.e. a projection onto the page on which FIG. 10 appears) is contained within a projection of a perimeter to the aperture 102 onto this longitudinal vertical plane. It is contemplated that, like the cap 122, the air filter 118 could only be partially aligned with the aperture 102 provided that there is sufficient room to remove the air filter 118 from the air filter housing 114 and displace it to then remove it through the aperture 102.

In the present implementation, the air filter assembly which consists of the air filter housing 114, the air filter 118 and the cap 122 is positioned as follows in the SSV 10 when the air filter assembly is assembled (i.e. the air filter 118 is inside the air filter housing 114 and the cap 122 is connected to the air filter housing 114). The air filter assembly is disposed forward of the two rear wheels 20B and rearward of the seat bases 28A. As can be seen in FIG. 5B, the air filter assembly is disposed partially forward of the plane 63. As can be seen in FIG. 6B, from a right side view of the SSV 10, the air filter assembly is inside the V-shape formed by the two cylinder axes 68. As such, the filter assembly is disposed longitudinally between the cylinder axes 68. The air inlet 108 is vertically higher than the air filter assembly. The air filter assembly is vertically lower than the floor 42 of the cargo box 34 (i.e. line 44 in FIG. 3). The air filter assembly, except for the tube 126, is vertically higher than the engine 62. The air filter assembly is also vertically higher than the fuel cap 86 (see FIG. 10). As the fuel cap 86 is connected to the highest point of the fuel tank 82, the air filter assembly is also vertically higher than the fuel tank 82. In the lateral direction, the air filter assembly is between the engine 62 and the side panel formed by the rear right fender 100.

As would be understood, the above-described vertical and longitudinal positions of the air filter assembly relative to various elements of the SSV 10 also correspond to the vertical and longitudinal positions of the central axis 120 of the air filter 118 relative to these elements.

Returning to FIGS. 5A to 6B, the air induction system 106 will continued to be described. An air intake conduit 128 extends from a left end of the air filter housing 114 and fluidly connects the air filter housing 114 with a throttle body 130. The throttle body 130 has a throttle valve (not shown) that is moved by a throttle motor 132. As can be seen in FIG. 6B, from a right side view of the SSV 10, the throttle body 130 is inside the V-shape formed by the two cylinder axes 68. As such, the throttle body 130 is disposed longitudinally between the cylinder axes 68. An air intake manifold 134 fluidly connects the throttle body 130 to air intake ports (not shown) of the cylinders 66 of the engine 62.

In the present implementation, the air induction system 106 is generally disposed on a right side of the engine 62. It is contemplated that the entire air induction system 106 or at least parts thereof could be disposed on a left side of the engine 62, behind the engine 62 or directly above the engine 62.

During operation of the engine 62, air enters the air inlet 108 through the grille 110, then flows into the chamber 112. From the chamber 112, air flows through the air intake conduit 116 to the air filter housing 114. Air in the air filter housing 114 flows through the air filter 118, which filters out dust and other air impurities from the air, and then flows out of the air filter housing 114. From the air filter housing 114, air flows through the air intake conduit 128, then through to the throttle body 130 and finally through the air intake manifold 134 into the combustion chambers (not shown) defined in part by the cylinders 66.

Turning now to FIGS. 7 to 11, the aperture 102 and the access panel 104 will be described in more detail. As previously described, the aperture 102 is defined in the rear right fender 100. It is contemplated that in some implementations the air filter 118 could be disposed on a left side of the engine 62, in which case the aperture 102 would be defined in the rear left fender 60. It is also contemplated that the aperture 102 could be defined completely or in part in one or more side body panels other than the rear right fender 100. The aperture 102 is forward of the rear wheels 20B and rearward of the seat bases 28A. The aperture 102 is vertically lower than the air inlet 108. As can be seen in FIG. 10, the aperture 102 tapers such that the top of the aperture 102 is longer than the bottom of the aperture 102. The aperture 102 is also inclined such that it extends rearward as it extends upward. It is contemplated that the aperture 102 could have other shapes, but the aperture 102 should be shaped and located so as to permit removal of the air filter 118 through the aperture 102. The aperture 102 is defined by a lip 136 formed by a recessed portion of the rear right fender 100. The lip 136 defines two apertures 138 and two notches 140 used to connect the access panel 104 to the rear right fender 100 as described below.

The access panel 104 is movable between a closed position and an open position. In the closed position shown in FIGS. 2 and 9, the access panel 104 is connected to the rear right fender 100, covers the aperture 102 and prevents access to the air filter 118 in the air filter housing 114. In the open position shown in FIGS. 3, 4, 10 and 11, the access panel 104 is removed from the rear right fender 100 and, therefore from the SSV 10, thereby exposing the aperture 102 to provide access to the air filter 118 in the air filter housing 114 when the cap 122 is removed. In the present implementation the access panel 104 is completely removable from the rear right fender 100, it is contemplated that the access panel 104 could be hinged or otherwise movably connected to the rear right fender 100 or the frame 18 such that the access panel 104 is moved to the open position by pivoting or otherwise moving the access panel 104 to expose the aperture 102 while remaining connected to the rear right fender 100 or the frame 18.

Figure 7:
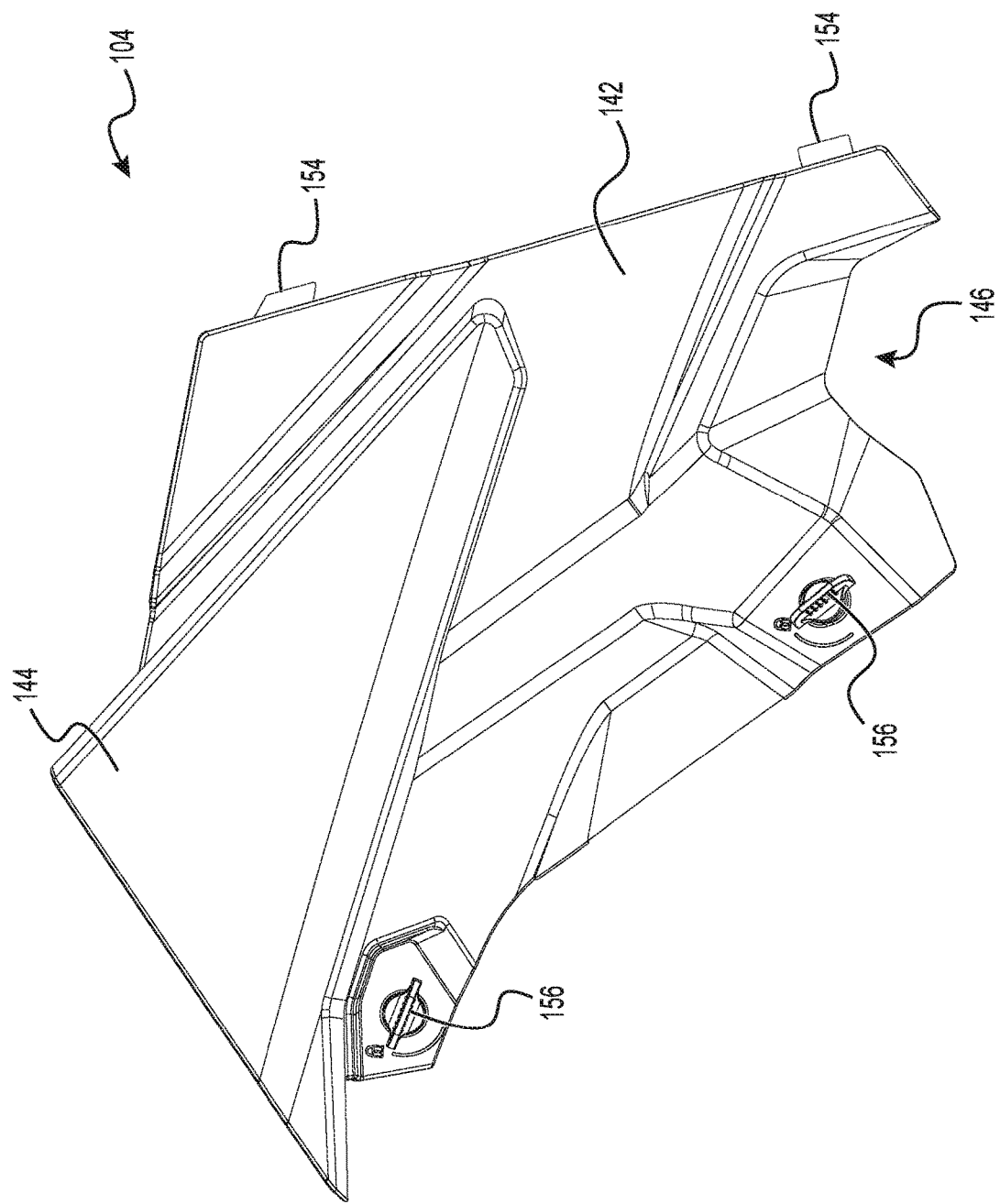
FIG. 7 is a right side elevation view of the access panel of the vehicle of FIG. 1.
Figure 8:
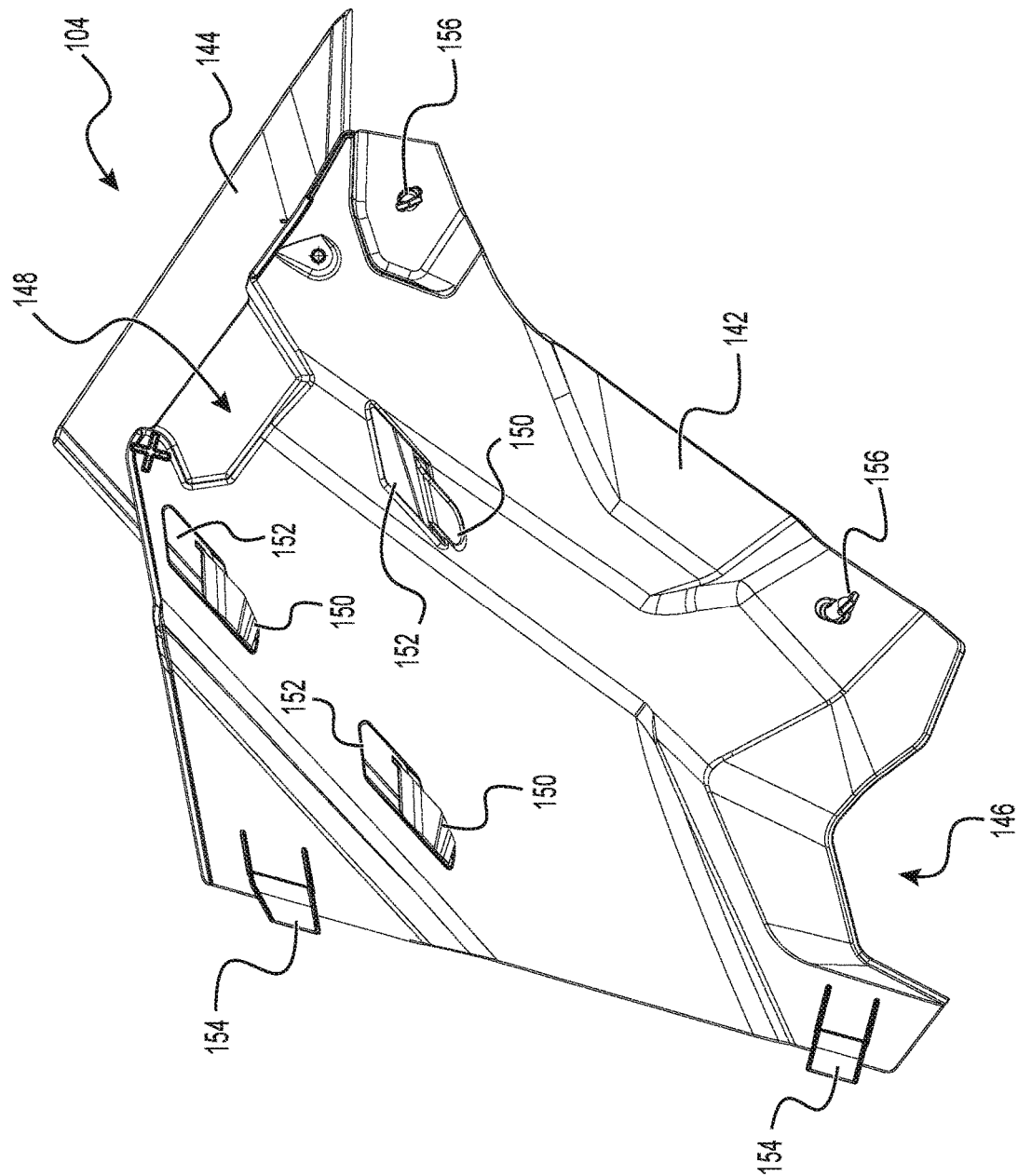
FIG. 8 is a left side elevation view of the access panel of FIG. 7.

With reference to FIGS. 7 and 8, it can be seen that the access panel 104 is shaped to cover the aperture 102. The access panel 104 is larger than the aperture 102. The access panel 104 is made of a main panel 142 and a secondary panel 144 disposed over the main panel 142 such that the secondary panel 144 is laterally outward of the main panel 142 when the access panel 104 is in the closed position. The main panel 142 is shaped to generally fit over the lip 136 of the rear right fender 100 defining the aperture 102. The main panel 142 has a recess 146 defined in a lower portion thereof to accommodate the fuel cap 86. The main panel 142 also has a recess 148 (FIG. 8) in an upper portion thereof. As can be seen in FIG. 8, the secondary panel 144 has three hooks 150 that slide into three apertures 152 in the main panel 142 to hook onto the main panel 142 thereby connecting the secondary panel 144 to the main panel 142. It is contemplated that the secondary panel 144 could be connected to the main panel 142 by other means. In the present implementation, the secondary panel 144 is present mainly for cosmetic reasons. As such, it is contemplated that the secondary panel 144 could be omitted, in which case the main panel 142 would not have the three apertures 152. It is also contemplated that the access panel 104 could be made of a single or more than two panels.

The access panel 104 has two forwardly extending tabs 154 extending from a forward portion of the main panel 142 on a laterally inner side thereof. The access panel 104 also has two quarter-turn spring loaded fasteners 156 extending through a rearward portion of the main panel 142. To install the access panel 104 over the aperture 102 and connect it to the rear right fender 100, the front portion of the access panel 104 is slid over the front portion of the lip 136 such that the tabs 154 are aligned with the notches 140 (FIG. 11) such that the lip 136 is disposed between the tabs 154 and the front portion of the main panel 142. The rear portion of the access panel 104 is then moved against the rear portion of the lip 136. By locating the tabs 154 with the notches 140, the quarter-turn spring loaded fasteners 156 are aligned with the apertures 138. The user finally pushes, turns clockwise and releases the quarter-turn fasteners 156 such that the ends of the fasteners 156 go through the apertures 138 and lock the access panel 104 onto the lip 136. To remove the access panel 104 from the rear right fender 100, the user pushes, turns counter-clockwise, and releases the fasteners 156 to unlock the access panel 104 and then pulls on the access panel 104. The fasteners 156 can be locked and unlocked one at a time and do not require the use of tools. As such the fasteners 156 are a type of tool-less fastener. It is contemplated that the access panel 104 could have more or less than two tabs 154 and/or more or less than two fasteners 156. It is also contemplated that the tabs 154 and the fasteners 156 could be disposed differently than illustrated, in which case the notches 140 and the apertures 138 would be positioned to correspond to these different positions. It is contemplated that the quarter-turn spring loaded fasteners 156 could be replaced by one or more tool-less fasteners of another type such as straps or latches. Fasteners requiring the use of tools are also contemplated. Other means of movably connecting the access panel 104 to the rear right fender 100 are also contemplated. Also, as previously described, it is contemplated that the access panel 104 could be hinged or otherwise movably connected to the rear right fender 100 or the frame 18.

Figure 11:
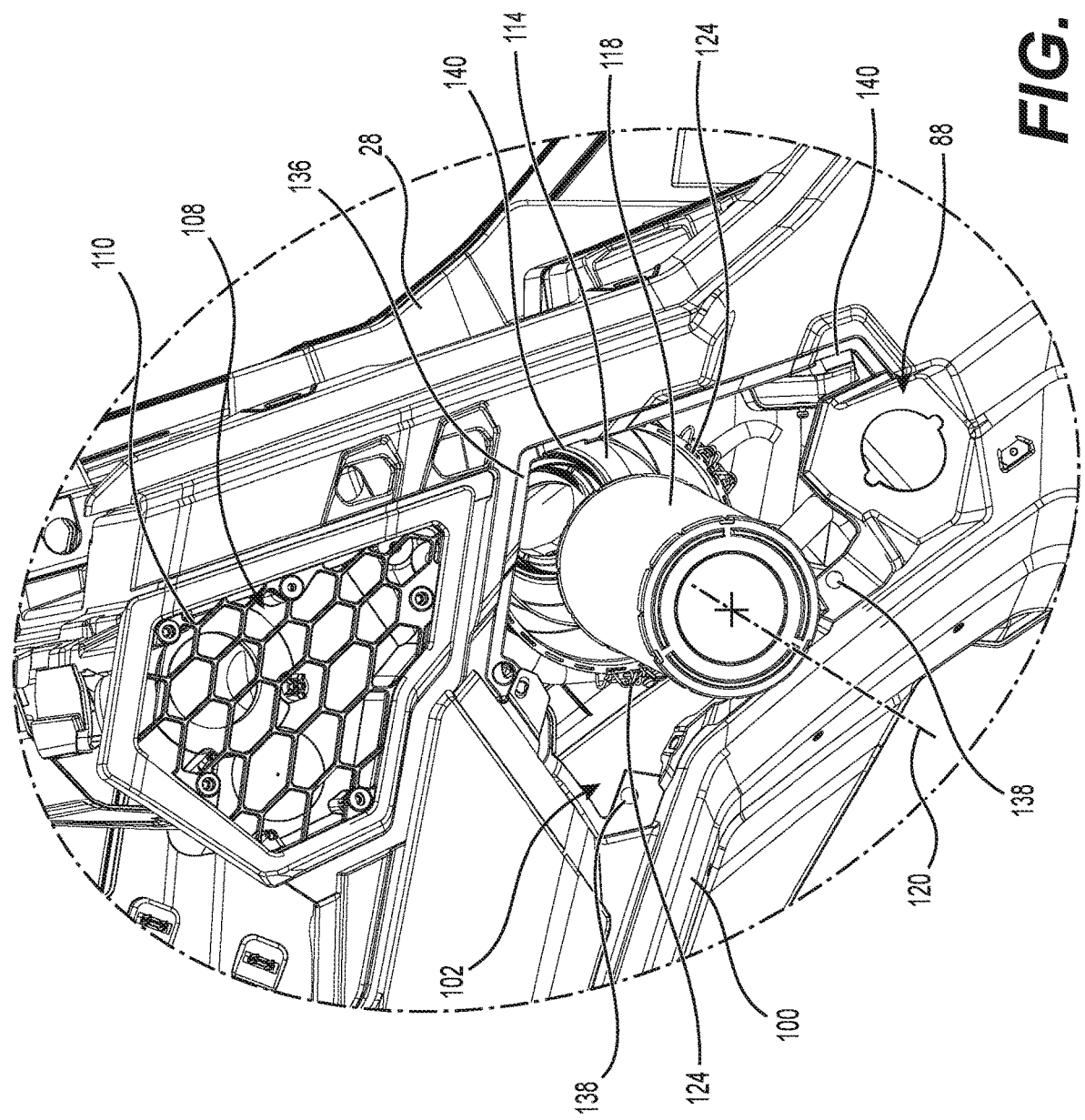
FIG. 11 is the close-up right side elevation view of FIG. 9 with the access panel and a cap of an air filter housing removed and showing an air filter removed from the air filter housing.

The method for removing the air filter 118 from the SSV 10 will now be described with reference to FIGS. 9 to 11. The method begins with the access panel 104 in the closed position as shown in FIG. 9. The fasteners 156 of the access panel 104 are unfastened and the access panel 104 is removed as described above. As a result, the access panel 104 is moved from its closed position to its open position and, as shown in FIG. 10, the aperture 102 is exposed and the cap 122 is accessible. Then, the clips 124 are unclipped. The cap 122 is then disconnected and removed from the air filter housing 114. The cap 122 is then removed from the SSV 10 through the aperture 102. As a result, the air filter 118 becomes exposed and accessible through the aperture 102. Finally, as shown in FIG. 11, the air filter 118 is removed from the air filter housing 114 and the SSV 10 by displacing the air filter 118 along the axis 120 through the aperture 102. The air filter 118 can then be cleaned or be replaced by another air filter. To install the air filter 118 or the replacement air filter in the SSV 10, the above steps are performed in the reverse order. It is contemplated that the air filter 118 could be removed from the SSV 10 through the aperture 102 by displacing it longitudinally and/or vertically as it is being moved laterally from the air filter housing 114. It is also contemplated that the air filter 118 could be rotated as it is moved laterally to remove it through the aperture 102.

Some non-limiting implementations of the present technology can be represented as presented in the following numbered clauses:

CLAUSE 1. A vehicle comprising: a frame; two front wheels operatively connected to the frame; two rear wheels operatively connected to the frame; a left seat connected to the frame; a right seat connected to the frame, the left and right seats being disposed side-by-side, each of the left and right seats having a seat base; an internal combustion engine connected to the frame, the internal combustion engine being disposed rearward of the seat bases, the internal combustion engine being operatively connected to at least one of: the two front wheels; and the two rear wheels; an air induction system fluidly connected to the internal combustion engine for supplying air to the internal combustion engine, the air induction system comprising: an air inlet; an air filter fluidly connected to the air inlet; and a throttle body fluidly connected between the air filter and the internal combustion engine, the air filter being fluidly connected between the air inlet and the throttle body, air to be supplied to the internal combustion engine flowing through the air inlet, then through the air filter, then through the throttle body and then to the internal combustion engine; at least one side body panel connected to a side of the frame, the at least one side body panel defining an aperture, the aperture facing generally laterally; and an access panel being movable between a first position and a second position, in the first position, the access panel being connected to the at least one side body panel and covering the aperture, in the second position, the access panel exposing the aperture, and the air filter being accessible through the aperture when the access panel is in the second position.

CLAUSE 2. The vehicle of clause 1, wherein the air filter is removable through the aperture when the access panel is in the second position.

CLAUSE 3. The vehicle of clause 1 or 2, wherein the air filter is at least partially aligned with the aperture.

CLAUSE 4. The vehicle of clause 3, wherein a projection of the air filter onto a longitudinal vertical plane is contained within a projection of a perimeter of the aperture onto the longitudinal vertical plane.

CLAUSE 5. The vehicle of any one of clauses 1 to 4, wherein: the air induction system further comprises an air filter housing, the air filter housing being fluidly connected between the air inlet and the throttle body, the air filter housing being at least partially aligned with the aperture; and the air filter is selectively disposed in the air filter housing.

CLAUSE 6. The vehicle of clause 5, wherein, when the access panel is in the second position, the air filter is removable through the aperture by displacing the air filter along a central axis of the air filter housing, the central axis extending through the aperture.

CLAUSE 7. The vehicle of clause 5 or 6, further comprising a cap selectively connected to the air filter housing, the cap being at least one of accessible and removable through the aperture when the access panel is in the second position; and wherein the air filter disposed in the air filter housing is accessible through the aperture when the access panel is in the second position and when the cap is disconnected from the filter housing.

CLAUSE 8. The vehicle of any one of clauses 1 to 7, wherein the air inlet is vertically higher than the air filter.

CLAUSE 9. The vehicle of any one of clauses 1 to 8, wherein the air inlet is rearward of the left and right seats.

CLAUSE 10. The vehicle of any one of clauses 1 to 9, wherein the air filter is vertically higher than the internal combustion engine.

CLAUSE 11. The vehicle of any one of clauses 1 to 10, wherein the air filter is rearward of the seat bases.

CLAUSE 12. The vehicle of any one of clauses 1 to 11, wherein the air filter is laterally between the internal combustion engine and the at least on side body panel.

CLAUSE 13. The vehicle of any one of clauses 1 to 12, further comprising a firewall disposed between internal combustion engine and the left and right seats.

CLAUSE 14. The vehicle of any one of clauses 1 to 13, further comprising a cargo box having a floor, the cargo box being connected to the frame and being disposed rearward of the left and right seats; and wherein the air filter is vertically lower than the floor of the cargo box.

CLAUSE 15. The vehicle of clause 14, wherein the air inlet is vertically higher than the floor of the cargo box.

CLAUSE 16. The vehicle of any one of clauses 1 to 15, further comprising a fuel tank connected to the frame and being disposed at least in part rearward of the seat bases; and wherein the air filter is vertically higher than the fuel tank.

CLAUSE 17. The vehicle of clause 16, wherein a portion of the fuel tank is disposed under one of the seat bases.

CLAUSE 18. The vehicle of clause 16 or 17, wherein: the fuel tank has a filler neck and a fuel cap; the filler neck extends through the at least one side body panel and defines a fuel tank inlet; the fuel cap selectively covers the fuel tank inlet; and the fuel cap is vertically lower than the air filter when the fuel cap covers the fuel tank inlet.

CLAUSE 19. The vehicle of any one of clauses 1 to 18, wherein, in the second position, the access panel is removed from the vehicle.

CLAUSE 20. The vehicle of any one of clause 1 to 19, wherein the at least one side body panel includes a rear fender, the rear fender defining at least a portion of the aperture.

CLAUSE 21. The vehicle of any one of clauses 1 to 20, wherein: the internal combustion engine includes a first cylinder having a first cylinder axis and a second cylinder having a second cylinder axis; and the air filter is disposed longitudinally between the first and second cylinder axes.

CLAUSE 22. The vehicle of clause 21, wherein the air inlet and the throttle body are disposed longitudinally between the first and second cylinder axes.

CLAUSE 23. The vehicle of any one of clauses 1 to 22, wherein the internal combustion engine is a V-type engine.

CLAUSE 24. The vehicle of any one of clauses 1 to 23, wherein the air filter is forward of the two rear wheels.

CLAUSE 25. The vehicle of any one of clauses 1 to 24, wherein the aperture is forward of the two rear wheels.

CLAUSE 26. A method for removing an air filter from a wheeled vehicle driven by an internal combustion engine comprising: moving an access panel from a first position to a second position, in the first position the access panel covering an aperture, in the second position the access panel exposing the aperture, the aperture being defined by at least one side body panel connected to a frame of the vehicle, the aperture facing generally laterally; and removing the air filter through the aperture.

CLAUSE 27. The method of clause 26, wherein moving the access panel from the first position to the second position comprises removing the access panel from the vehicle.

CLAUSE 28. The method of clause 26 or 27, further comprising removing the air filter from an air filter housing prior to removing the air filter through the aperture.

CLAUSE 29. The method of clause 28, further comprising removing a cap from the air filter housing prior to removing the air filter from the air filter housing.

CLAUSE 30. The method of any one of clauses 26 to 29, wherein removing the air filter through the aperture comprises displacing the air filter through the aperture along a generally laterally extending axis.

CLAUSE 31. The method of clause 30, wherein the generally laterally extending axis is vertically higher than the internal combustion engine.

CLAUSE 32. The method of clause 30 or 31, wherein the generally laterally extending axis is rearward of the seat bases.

CLAUSE 33. The method of any one of clauses 30 to 32, wherein the generally laterally extending axis is vertically lower than a floor of a cargo box of the vehicle.

CLAUSE 34. The method of any one of clauses 30 to 33, wherein the generally laterally extending axis is vertically higher than a fuel tank of the vehicle.

CLAUSE 35. The method of any one of clauses 30 to 34, wherein the generally laterally extending axis extends between two cylinder axes defined by two cylinders of the internal combustion engine.

CLAUSE 36. The method of any one of clauses 30 to 35, wherein the generally laterally extending axis is forward of two rear wheels of the vehicle.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
   a frame;
   two front wheels operatively connected to the frame;
   two rear wheels operatively connected to the frame;
   a left seat connected to the frame;
   a right seat connected to the frame, the left and right seats being disposed side-by-side, each of the left and right seats having a seat base;
   an internal combustion engine connected to the frame, the internal combustion engine being disposed rearward of the seat bases, the internal combustion engine being operatively connected to at least one of:
      the two front wheels; and
      the two rear wheels;
   an air induction system fluidly connected to the internal combustion engine for supplying air to the internal combustion engine, the air induction system comprising:
      an air inlet;
      an air filter fluidly connected to the air inlet; and
      a throttle body fluidly connected between the air filter and the internal combustion engine, the air filter being fluidly connected between the air inlet and the throttle body,
      air to be supplied to the internal combustion engine flowing through the air inlet, then through the air filter, then through the throttle body and then to the internal combustion engine;
   at least one side body panel connected to a side of the frame, the at least one side body panel defining an aperture, the aperture facing generally laterally, the aperture being forward of the two rear wheels, the at least one side body panel includes a rear fender, the rear fender defining at least a portion of the aperture; and
   an access panel being movable between a first position and a second position,
   in the first position, the access panel being connected to the at least one side body panel and covering the aperture,
   in the second position, the access panel exposing the aperture, and
   the air filter being accessible through the aperture when the access panel is in the second position.

2. The vehicle of claim 1, wherein:
   the air filter is removable through the aperture when the access panel is in the second position; and
   the air filter is at least partially aligned with the aperture.

3. The vehicle of claim 1, wherein:
   the air induction system further comprises an air filter housing, the air filter housing being fluidly connected between the air inlet and the throttle body, the air filter housing being at least partially aligned with the aperture; and
   the air filter is selectively disposed in the air filter housing.

4. The vehicle of claim 3, wherein, when the access panel is in the second position, the air filter is removable through the aperture by displacing the air filter along a central axis of the air filter housing, the central axis extending through the aperture.

5. The vehicle of claim 1, wherein the air inlet is vertically higher than the air filter.

6. The vehicle of claim 1, wherein the air inlet is rearward of the left and right seats.

7. The vehicle of claim 1, wherein the air filter is vertically higher than the internal combustion engine.

8. The vehicle of claim 1, wherein the air filter is rearward of the seat bases.

9. The vehicle of claim 1, wherein:
   the internal combustion engine includes a first cylinder having a first cylinder axis and a second cylinder having a second cylinder axis; and
   the air filter is disposed longitudinally between the first and second cylinder axes.

10. The vehicle of claim 9, wherein the air inlet and the throttle body are disposed longitudinally between the first and second cylinder axes.

11. The vehicle of claim 1, wherein the air filter is forward of the two rear wheels.

12. A vehicle comprising:
   a frame;
   two front wheels operatively connected to the frame;
   two rear wheels operatively connected to the frame;
   a left seat connected to the frame;
   a right seat connected to the frame, the left and right seats being disposed side-by-side, each of the left and right seats having a seat base;
   an internal combustion engine connected to the frame, the internal combustion engine being disposed rearward of the seat bases, the internal combustion engine being operatively connected to at least one of:
      the two front wheels; and
      the two rear wheels;
   an air induction system fluidly connected to the internal combustion engine for supplying air to the internal combustion engine, the air induction system comprising:
      an air inlet;
      an air filter fluidly connected to the air inlet;
      a throttle body fluidly connected between the air filter and the internal combustion engine, the air filter being fluidly connected between the air inlet and the throttle body; and
      an air filter housing being fluidly connected between the air inlet and the throttle body, the air filter being selectively disposed in the air filter housing,
      air to be supplied to the internal combustion engine flowing through the air inlet, then through the air filter, then through the throttle body and then to the internal combustion engine;
   at least one side body panel connected to a side of the frame, the at least one side body panel defining an aperture, the aperture facing generally laterally, the aperture being forward of the two rear wheels, the air filter housing being at least partially aligned with the aperture;
   an access panel being movable between a first position and a second position,
   in the first position, the access panel being connected to the at least one side body panel and covering the aperture, in the second position, the access panel exposing the aperture; and a cap selectively connected to the air filter housing, the cap being at least one of accessible and removable through the aperture when the access panel is in the second position, the air filter disposed in the air filter housing being accessible through the aperture when the access panel is in the second position and when the cap is disconnected from the filter housing.

13. A vehicle comprising:

a frame;

two front wheels operatively connected to the frame;

two rear wheels operatively connected to the frame;

a left seat connected to the frame;

a right seat connected to the frame, the left and right seats being disposed side-by-side, each of the left and right seats having a seat base;

an internal combustion engine connected to the frame, the internal combustion engine being disposed rearward of the seat bases, the internal combustion engine being operatively connected to at least one of:

the two front wheels; and the two rear wheels;

an air induction system fluidly connected to the internal combustion engine for supplying air to the internal combustion engine, the air induction system comprising:

an air inlet;

an air filter fluidly connected to the air inlet; and a throttle body fluidly connected between the air filter and the internal combustion engine, the air filter being fluidly connected between the air inlet and the throttle body, air to be supplied to the internal combustion engine flowing through the air inlet, then through the air filter, then through the throttle body and then to the internal combustion engine;

at least one side body panel connected to a side of the frame, the at least one side body panel defining an aperture, the aperture facing generally laterally, the aperture being forward of the two rear wheels; and an access panel being movable between a first position and a second position, in the first position, the access panel being connected to the at least one side body panel and covering the aperture, in the second position, the access panel exposing the aperture, the air filter being accessible through the aperture when the access panel is in the second position, and the air filter being laterally between the internal combustion engine and the at least on side body panel.

14. The vehicle of claim 13, wherein:

the air filter is removable through the aperture when the access panel is in the second position; and the air filter is at least partially aligned with the aperture.

15. The vehicle of claim 13, wherein:

the air induction system further comprises an air filter housing, the air filter housing being fluidly connected between the air inlet and the throttle body, the air filter housing being at least partially aligned with the aperture;

the air filter is selectively disposed in the air filter housing; and when the access panel is in the second position, the air filter is removable through the aperture by displacing the air filter along a central axis of the air filter housing, the central axis extending through the aperture.

16. The vehicle of claim 13, wherein the air inlet is vertically higher than the air filter.

17. The vehicle of claim 13, wherein the air filter is rearward of the seat bases.

18. A vehicle comprising:

a frame;

two front wheels operatively connected to the frame;

two rear wheels operatively connected to the frame;

a left seat connected to the frame;

a right seat connected to the frame, the left and right seats being disposed side-by-side, each of the left and right seats having a seat base;

an internal combustion engine connected to the frame, the internal combustion engine being disposed rearward of the seat bases, the internal combustion engine being operatively connected to at least one of:

the two front wheels; and the two rear wheels;

an air induction system fluidly connected to the internal combustion engine for supplying air to the internal combustion engine, the air induction system comprising:

an air inlet;

an air filter fluidly connected to the air inlet; and a throttle body fluidly connected between the air filter and the internal combustion engine, the air filter being fluidly connected between the air inlet and the throttle body, air to be supplied to the internal combustion engine flowing through the air inlet, then through the air filter, then through the throttle body and then to the internal combustion engine;

at least one side body panel connected to a side of the frame, the at least one side body panel defining an aperture, the aperture facing generally laterally, the aperture being forward of the two rear wheels;

an access panel being movable between a first position and a second position, in the first position, the access panel being connected to the at least one side body panel and covering the aperture, in the second position, the access panel exposing the aperture, and the air filter being accessible through the aperture when the access panel is in the second position;

a firewall disposed between internal combustion engine and the left and right seats; and a cargo box having a floor, the cargo box being connected to the frame and being disposed rearward of the left and right seats, the air filter being vertically lower than the floor of the cargo box, and the air inlet being vertically higher than the floor of the cargo box.

19. The vehicle of claim 18, wherein:

the air filter is removable through the aperture when the access panel is in the second position; and the air filter is at least partially aligned with the aperture.

20. The vehicle of claim 18, wherein:

the air induction system further comprises an air filter housing, the air filter housing being fluidly connected between the air inlet and the throttle body, the air filter housing being at least partially aligned with the aperture;

the air filter is selectively disposed in the air filter housing; and when the access panel is in the second position, the air filter is removable through the aperture by displacing the air filter along a central axis of the air filter housing, the central axis extending through the aperture.

21. The vehicle of claim 18, wherein the air inlet is vertically higher than the air filter.

22. A vehicle comprising:
a frame;
two front wheels operatively connected to the frame;
two rear wheels operatively connected to the frame;
a left seat connected to the frame;
a right seat connected to the frame, the left and right seats being disposed side-by-side, each of the left and right seats having a seat base;
an internal combustion engine connected to the frame, the internal combustion engine being disposed rearward of the seat bases, the internal combustion engine being operatively connected to at least one of:
the two front wheels; and
the two rear wheels;
an air induction system fluidly connected to the internal combustion engine for supplying air to the internal combustion engine, the air induction system comprising:
an air inlet;
an air filter fluidly connected to the air inlet; and
a throttle body fluidly connected between the air filter and the internal combustion engine, the air filter being fluidly connected between the air inlet and the throttle body,
air to be supplied to the internal combustion engine flowing through the air inlet, then through the air filter, then through the throttle body and then to the internal combustion engine;
a fuel tank connected to the frame and being disposed at least in part rearward of the seat bases, the fuel tank having a filler neck and a fuel cap,
the air filter being vertically higher than the fuel tank;
at least one side body panel connected to a side of the frame, the at least one side body panel defining an aperture, the aperture facing generally laterally,
the filler neck extending through the at least one side body panel and defining a fuel tank inlet,
the fuel cap selectively covering the fuel tank inlet,
the fuel cap being vertically lower than the air filter when the fuel cap covers the fuel tank inlet; and
an access panel being movable between a first position and a second position,
in the first position, the access panel being connected to the at least one side body panel and covering the aperture,
in the second position, the access panel exposing the aperture, and
the air filter being accessible through the aperture when the access panel is in the second position.

23. The vehicle of claim 22, wherein a portion of the fuel tank is disposed under one of the seat bases.

24. A vehicle comprising:
a frame;
two front wheels operatively connected to the frame;
two rear wheels operatively connected to the frame;
a left seat connected to the frame;
a right seat connected to the frame, the left and right seats being disposed side-by-side, each of the left and right seats having a seat base;
an internal combustion engine connected to the frame, the internal combustion engine being disposed rearward of the seat bases, the internal combustion engine being operatively connected to at least one of:
the two front wheels; and
the two rear wheels;
an air induction system fluidly connected to the internal combustion engine for supplying air to the internal combustion engine, the air induction system comprising:
an air inlet;
an air filter fluidly connected to the air inlet; and
a throttle body fluidly connected between the air filter and the internal combustion engine, the air filter being fluidly connected between the air inlet and the throttle body,
air to be supplied to the internal combustion engine flowing through the air inlet, then through the air filter, then through the throttle body and then to the internal combustion engine;
at least one side body panel connected to a side of the frame, the at least one side body panel defining an aperture, the aperture facing generally laterally, the aperture being forward of the two rear wheels; and
an access panel being movable between a first position and a second position,
in the first position, the access panel being connected to the at least one side body panel and covering the aperture,
in the second position, the access panel exposing the aperture,
the air filter being accessible through the aperture when the access panel is in the second position, and
in the second position, the access panel being removed from the vehicle.

25. The vehicle of claim 24, wherein:
the air filter is removable through the aperture when the access panel is in the second position; and
the air filter is at least partially aligned with the aperture.

26. The vehicle of claim 24, wherein:
the air induction system further comprises an air filter housing, the air filter housing being fluidly connected between the air inlet and the throttle body, the air filter housing being at least partially aligned with the aperture; and
the air filter is selectively disposed in the air filter housing.

27. The vehicle of claim 26, wherein, when the access panel is in the second position, the air filter is removable through the aperture by displacing the air filter along a central axis of the air filter housing, the central axis extending through the aperture.

28. The vehicle of claim 26, further comprising a cap selectively connected to the air filter housing, the cap being at least one of accessible and removable through the aperture when the access panel is in the second position; and
wherein the air filter disposed in the air filter housing is accessible through the aperture when the access panel is in the second position and when the cap is disconnected from the filter housing.

29. The vehicle of claim 24, wherein the air inlet is vertically higher than the air filter.

30. The vehicle of claim 24, wherein the air inlet is rearward of the left and right seats.

31. The vehicle of claim 24, wherein the air filter is vertically higher than the internal combustion engine.

32. The vehicle of claim 24, wherein the air filter is rearward of the seat bases.

33. The vehicle of claim 24, wherein the air filter is laterally between the internal combustion engine and the at least on side body panel.

34. The vehicle of claim 24, further comprising:
a firewall disposed between internal combustion engine and the left and right seats; and
a cargo box having a floor, the cargo box being connected to the frame and being disposed rearward of the left and right seats; and
wherein:
the air filter is vertically lower than the floor of the cargo box; and
the air inlet is vertically higher than the floor of the cargo box.

* * * * *